Patented May 24, 1938

2,118,225

UNITED STATES PATENT OFFICE 2,118,225

ANTISEPTIC PRODUCTS

John Stanton Pierce, Georgetown, Ky.

No Drawing. Application November 1, 1935,
Serial No. 47,906

7 Claims. (Cl. 167—72)

This invention relates to a new and useful antiseptic solution and has particular relation to an aqueous solution containing a metallic salt and an organic solvent. It is, of course, well known that many metallic salts have antiseptic properties. For example, aqueous solutions of mercuric chloride ($HgCl_2$), silver nitrate ($AgNO_3$) and the soluble salts of cadmium all have high germicidal values. However, they are all so toxic to living tissues that their general use is somewhat restricted. In addition, certain metallic salts, such as silver nitrate, have staining properties which further limit their usefulness. On the other hand, it is known that the soluble salts of aluminum, such as aluminum chloride ($AlCl_3$) have antiseptic (and styptic) properties, but, unless highly concentrated, their respective antiseptic actions are not sufficiently high to warrant general use.

Ethyl alcohol ($C_2H_5OH$) is also known and widely used as a very strong antiseptic. A 70% aqueous solution of it is particularly germicidal. Naturally, by diluting it sufficiently with water, its effectiveness can be reduced to a point at which it has no real antiseptic value. Thus, an aqueous solution containing 25%, by weight, of ethyl alcohol, is not recommended as a germicide.

The foregoing makes it evident that neither an aqueous solution of aluminum chloride (unless highly concentrated) nor a dilute aqueous solution of alcohol is highly powerful as a germicide, and it is reasonable to suppose that a mixture of these two products in dilute aqueous solution will be of no great value. I have discovered, however, that the addition of an aqueous solution of aluminum chloride to ethyl alcohol, even when the water content is high enough to render both fairly dilute, produces a very powerful germicide which may be used to advantage for this purpose.

The principal object of my invention is, therefore, concerned with the production of a strong antiseptic of this general character, and preferably one having non-staining properties.

Another object is to provide an effective antiseptic solution having useful styptic properties.

I have found that a solution composed, for example, of aluminum chloride ($AlCl_3 6H_2O$), ethyl alcohol ($C_2H_5OH$), and water ($H_2O$) in the ratio of say 20, 25 and 55 by weight not only has extremely good antiseptic and styptic properties, but that its antiseptic or bactericidal effect is substantially greater than that of an aqueous solution of either aluminum chloride or ethyl alcohol in the same relative concentration.

This phenomenal increase in bactericidal effect is not limited to aluminum chloride but is shown by other very soluble aluminum salts such as the chloride, bromide, iodide, and nitrate. Generally speaking, all of these salts, are effective substantially to increase the bactericidal effect when their common hydrated salts are used in quantities ranging approximately from 15 to 38% by weight of the entire solution. The very soluble aluminum halides are effective even when used in quantities as low as 10% by weight. A very soluble salt, as used herein, is intended to designate a salt more soluble than aluminum sulphate ($Al_2(SO_4)_3.18H_2O$) in an aqueous solution containing 30% alcohol.

This unexpected increase in bactericidal effect also is shown when acetone is added to an aqueous solution of any of the foregoing metallic salts. Either acetone or ethyl alcohol is effective in quantities ranging approximately from 15% to 38% of the total weight of the solution. This unexpected increase in bactericidal effect still is noted when certain organic antiseptics are present.

The amount of water added to the mixture of any of the above salts and acetone or alcohol should not be appreciably less than one and one-fourth ($1\frac{1}{4}$) times heavier than the weight of the heavier ingredient; i. e., the ingredient having the heaviest weight. For example, with the salt at 22% and the alcohol at 26%, the relative water content would be 52%. However, if the percentage of alcohol, for example, is increased, the water content may be correspondingly decreased down to but not below the point at which its weight is 25% greater than that of the alcohol.

As a result of experiment and use, I have found a particularly efficacious solution to consist of 15% to 30% aluminum chloride, 15% to 30% of either acetone or ethyl alcohol, and 45% or more of water. These, and other solutions mentioned herein, are of value not only because of their high germicidal effect, but also, in many cases, because of their styptic properties. Furthermore, all of them are relatively non-toxic to living tissue. As a result, any solution made in accordance with this invention is not only suited for the treatment of cuts, skin abrasions, etc., occurring anywhere, but particularly adapted for use on exposed portions of the body, such as the face.

Having described my invention, I claim:

1. An antiseptic product comprising 15 to 38% of a very soluble low toxic salt of aluminum, 15 to 38% of a solvent selected from the group consisting of ethyl alcohol and acetone, and at least 25% more water than the heavier of the other ingredients.

2. An antiseptic product comprising 15 to 38% of a very soluble aluminum salt, 15 to 38% acetone, and at least 25% more water than the heavier of the other ingredients.

3. An antiseptic product comprising 15 to 38% of a very soluble aluminum salt, 15 to 38% ethyl alcohol, and at least 25% more water than the heavier of the other ingredients.

4. An antiseptic product comprising 10 to 38% of a very soluble aluminum halide, 15 to 38% acetone, and at least 25% more water than the heavier of the other ingredients.

5. An antiseptic product comprising 10 to 38% of a very soluble aluminum halide, 15 to 38% ethyl alcohol, and at least 25% more water than the heavier of the other ingredients.

6. An antiseptic product comprising 10 to 38% aluminum chloride, 15 to 38% acetone, and at least 25% more water than the heavier of the other ingredients.

7. An antiseptic product comprising 10 to 38% aluminum chloride, 15 to 38% ethyl alcohol, and at least 25% more water than the heavier of the other ingredients.

JOHN STANTON PIERCE.